(12) United States Patent
Wideman et al.

(10) Patent No.: US 6,972,309 B1
(45) Date of Patent: Dec. 6, 2005

(54) CURE SYSTEM FOR POLYISOPRENE RUBBER

(75) Inventors: Lawson Gibson Wideman, Hudson, OH (US); Vanessa Marika Guscoff, Wadsworth, OH (US); Michael Joseph Rachita, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/870,794

(22) Filed: Jun. 17, 2004

(51) Int. Cl.[7] .............................. C08F 8/42; C08L 83/06
(52) U.S. Cl. ...................... 525/106; 525/319; 525/342; 524/506
(58) Field of Search ............................... 525/106, 319, 525/342; 524/506

(56) References Cited

U.S. PATENT DOCUMENTS

| | | | |
|---|---|---|---|
| 3,159,601 A | 12/1964 | Ashby | 260/46.5 |
| 3,159,662 A | 12/1964 | Ashby | 260/448.2 |
| 3,220,972 A | 11/1965 | Lamoreaux | 260/46.5 |
| 4,461,883 A | 7/1984 | Takeuchi et al. | 526/139 |
| 5,414,048 A * | 5/1995 | Eian | 525/326.2 |
| 5,672,660 A * | 9/1997 | Medsker et al. | 525/101 |
| 6,087,456 A | 7/2000 | Sakaguchi et al. | 525/342 |
| 6,136,931 A | 10/2000 | Jang et al. | 526/133 |

OTHER PUBLICATIONS

U.S. Appl. No. 10/273,918, filed Oct. 18, 2002, Kerns et al.
U.S. Appl. No. 10/368,660, filed Feb. 18, 2003, Rachita et al.

* cited by examiner

*Primary Examiner*—James J. Seidleck
*Assistant Examiner*—Olga Asinovsky
(74) *Attorney, Agent, or Firm*—Alvin T. Rockhill

(57) ABSTRACT

The present invention is based upon the unexpected finding that polyisoprene rubber which is clear and of high purity can be cured utilizing the curative system of this invention to attain an elongation at break of greater than 1200% without compromising the clarity or purity of the rubber. The curative system of this invention is comprised of a carbonyl inhibited platinum catalyst, and a branched crosslinking agent having at least 2 hydrosilyl groups per molecule. The curative system of this invention can be used to cure solid polyisoprene rubber that is used in a wide variety of application and is a particular value in curing polyisoprene rubber used in manufacturing sporting goods, healthcare, and medical products. The present invention more specifically discloses a curable polyisoprene rubber composition comprising: (1) a polyisoprene rubber comprised of repeat units that are derived from isoprene monomer, (2) a carbonyl inhibited platinum catalyst, and (3) a crosslinking agent having at least 2 hydrosilyl groups per molecule.

14 Claims, No Drawings

CURE SYSTEM FOR POLYISOPRENE RUBBER

BACKGROUND OF THE INVENTION

The use of natural rubber in the medical and health care industries can expose atopic individuals to latex allergens. It is believed that as much as 6% of the general population, and as high as 12% of those working in the medical profession, are latex sensitive and display allergic reactions when exposed to proteins found in natural rubber (see M. McNulty, *Rubber & Plastics News* Jun. 25, 2001, page. 5). The symptoms of latex allergy range from mild contact dermatitis to life-threatening anaphylaxis, which includes a rapid drop in blood pressure and difficulty breathing. Even though a heightened awareness of latex allergy now exists, the number of people becoming sensitized to natural rubber is increasing as more professions require the use of latex gloves to avoid exposure to infectious agents. It is therefore not surprising, that with over 40,000 consumer products containing natural rubber (see Information from Allergy Advisor-Zing Solutions, http://allergyadvisor.com) an alternative protein free material is desired in many applications.

Although techniques exist for enzymatic deproteinization of natural rubber (see S. Kawahara, T. Kakubo, N. Nishiyama, Y. Tanaka, Y. Isono, J. T. Sakdapipanich, *J. Appl. Polym. Sci.* 78, 1510 (2000) and A. H. Eng, S. Kawahara, Y. J. Tanaka, Nat. Rubb. Res. 8, 109 (1993), as well as manufacturing practices that lower the total allergens present in latex goods, currently, the most effective way to provide protein free products is to use petrochemical derived synthetic rubbers. In fact, a report from the Johns Hopkins University School of Medicine recommended that the Food and Drug Administration mandate a switch from using stoppers made with natural rubber to using all synthetic rubber medicine stoppers (again see M. McNulty, *Rubber & Plastics News* Jun. 25, 2001). The synthetic rubber most closely related to natural rubber (NR), is high cis-polyisoprene. Typically, this material is prepared through the use of either stereospecific titanium catalysts or with alkyl-lithium initiators. Both of these systems are effective at providing protein free synthetic polyisoprene, however, the two polymers differ greatly with respect to their micro- and macrostructure. Polymerization of isoprene with titanium tetrachloride activated with a trialkylaluminum co-catalyst results in a material with upwards of 98% 1,4-cis content (see W. Cooper, in W. M. Saltman, ed., *The Stereo Rubbers*, John Wiley & Sons, New York, 1977, page 48).

Polyisoprene produced commercially with alkyl lithium initiators generally does not have a cis content higher than 92%. Differences in microstructure, as well as macrostructure, allows the titanium polyisoprene (Ti—PI), but not the lithium polyisoprene (Li—PI), to display the unique advantage of strain-induced crystallization. It is the property of rapid crystallization that allows NR and Ti—PI to have high tensile strength and modulus even without the use of reinforcing fillers, a condition often found in gum stocks commonly used in the production of medical goods (see A. R. Bean, Jr., et. al., in H. F. Mark, N. G. Gaylord, N. M. Bikales, ed., *Encyclopedia of Polymer Science and Technology*, John Wiley & Sons, New York, Vol. 7, 1967, page. 823). Although Li—PI lacks the microstructural regularity of Ti—PI, it does have the advantage of being gel free with a narrow molecular weight distribution and linear macrostructure. These attributes allow Li—PI to display lower hysteretic properties at a lower cross-link density than NR or Ti—PI.

The use of Ti—PI and Li—PI in the medical and health care industries has gained acceptance, yet there is still need for a number of improvements. For example, the consistency of Ti—PI is very dependent on the aluminum to titanium ratio that is used during catalyst preparation (see W. Cooper, in W. M. Saltman, ed., *The Stereo Rubbers*, John Wiley & Sons, New York, 1977, page 48). If the ratio drops below unity the titanium is not sufficiently reduced, causing the formation of gel in the polymer. On the other hand, if the catalyst is over-reduced, oligomers will be produced giving the material a strong odor. Both of these unwanted side reactions must be carefully controlled. Current titanium systems also suffer from inferior activity and high levels of titanium must be used resulting in elevated levels of catalyst residues and terminating agents in the finished polymer. An overall reduction in foreign substances remaining in synthetic polyisoprene is of paramount importance when the production of a clean high performance material is desired.

Li—PI is considered a clean polymer due to the use of low levels of initiator during production and lack of extractables. However, the dependence of cis content on lithium concentration leads to a polymer with very high molecular weight (see H. L. Hsieh, R. P. Quirk, *Anionic Polymerization Principles and Practical Applications*, Marcel Dekker, Inc., New York, 1996, p. 201). The high molecular weight, coupled with a narrow molecular weight distribution, makes processing this material difficult. Commonly a low molecular weight fraction is added to commercial material to act as a processing aid.

The use of neodymium catalyzed polyisoprene (Nd—PI), as a source of protein free synthetic natural rubber offers the combined advantages of both TI—PI and Li—PI without their respective disadvantages. Nd—PI with a cis 1,4-content as high as 98%, gel and oligomer free, linear with a moderate molecular weight distribution, easy to process, and low in volatile and extractable residues is ideally suited for many clean high performance applications (see U.S. patent application Ser. No. 10/273,918).

The technique of combining a neodymium salt, an aluminum alkyl, a halide source, and a diene to attain an improved result is the subject of U.S. patent application Ser. No. 10/368,660, filed on Feb. 18, 2003. As the prior art describes, most any conjugated diene monomer can be used in the preforming step, and that each diene can be treated in the same way. For example, prior teachings imply that the contact time between the conjugated diene and the neodymium/aluminum co-catalyst treatment step is not crucial and that aging should occur after the halide source has been added. However, U.S. patent application Ser. No. 10/368, 660 explains that a minimum contact time does indeed exist for different conjugated dienes when the preparation of a completely soluble catalyst is desired. It is also crucial that this contact time occurs prior to the introduction of a halide source in order to ensure completely soluble catalyst solutions. For example, formation of a homogeneous catalyst solution is achieved when isoprene is used in the preform only if the isoprene/neodymium/aluminum alkyl solution is allowed to age for an extended amount of time prior to aluminium-chloride addition. If the first step is not allowed to proceed long enough, a precipitate is formed upon addition of aluminum-chloride. When butadiene is used in the preforming reaction this first aging period is still crucial, yet, significantly less time is needed to ensure a homogenous catalyst.

The technological advantage of a completely soluble preformed catalyst has previously been appreciated. As U.S. Pat. No. 4,461,883 teaches, a heterogeneous system is a disadvantage in an industrial setting. Likewise, U.S. Pat. No. 6,136,931 states that the use of heterogeneous catalyst systems containing suspended particles usually produces gel. This patent also states a heterogeneous system, compared to a homogeneous one, is more difficult to control the exact amount of catalyst added during the polymerization. Similarly, U.S. patent application Ser. No. 10/368,660 indicates that catalyst prepared without the first aging period results in a catalyst suspension of a fine precipitate. This suspension settles upon standing into two phases. If the resulting supernate, or top layer, is used to polymerize a conjugated diene, extremely inefficient catalyst activity results. Catalyst activity can be restored in these systems only after agitation of the by-phasic mixtures. This allows for the introduction of a heterogeneous catalyst suspension to the monomer to be polymerized. However, it is now possible to ensure consistent and highly active soluble preformed catalyst formation by utilizing the appropriate two step aging technique. This is of obvious technological advantage, since there would be no need to use a stirred tank catalyst storage tank or other engineering constraints to ensure consistent catalyst suspensions.

The neodymium catalyst system prepared by the technique described in U.S. patent application Ser. No. 10/368,660 can be used in the polymerization of isoprene monomer into polyisoprene rubber that is clear (transparent) and of high purity. United States Patent application Ser. No. 10/368,660 more specifically discloses a process for the synthesis of polyisoprene rubber which comprises polymerizing isoprene monomer in the presence of a neodymium catalyst system, wherein the neodymium catalyst system is prepared by (1) reacting a neodymium carboxylate with an organoaluminum compound in the presence of isoprene for a period of about 10 minutes to about 30 minutes to produce neodymium-aluminum catalyst component, and (2) subsequently reacting the neodymium-aluminum catalyst component with a dialkyl aluminum chloride for a period of at least 30 minutes to produce the neodymium catalyst system.

It is, of course, important for high purity polyisoprene rubbers to be cured using a technique that will not compromise the purity or clarity of the rubber. By the same token, it is also important for cured rubber articles made with such polyisoprene rubber to exhibit good mechanical properties. For instance, in many applications it is important for the cured polyisoprene rubber to have the highest possible elongation at break.

SUMMARY OF THE INVENTION

The present invention is based upon the unexpected finding that polyisoprene rubber which is clear and of high purity can be cured utilizing the curative system of this invention to attain an elongation at break of greater than 1200% without compromising the clarity or purity of the rubber. The curative system of this invention is comprised of a carbonyl inhibited platinum catalyst, and a crosslinking agent having at least 2 hydrosilyl groups per molecule.

The curative system of this invention can be used to cure polyisoprene rubber that is used in a wide variety of applications and is a particular value in curing polyisoprene rubber used in manufacturing sporting goods, healthcare, and medical products. Some specific applications include: bandages, drug delivery patches, suture tape, medical devices, pharmaceutical closures, including syringe plungers and sleeves, needle shields, injection sites, vial closures and stoppers, tourniquets, exercise bands, cosmetics, condoms and prophylactic devices, gloves and glove dip, IV and other bags, tubing, clean room applications, baby bottle nipples and teething devices, dental and orthodontic applications, chewing gum and slow release delivery gums, food additives, packaging and delivery systems for food including beverage tubing, conveyor belting and rollers, seals and coatings, potable water systems, pet chew toys, adhesive tapes, duct tapes, labels, envelopes, sticky notes, coatings, sealants, including cold seal adhesives for candy wrappers, diaper tabs, elastic thread for garments and sporting goods, calendered stock for clothing, rubber bands, rubber grips for tools and appliances, liquid crystal encapsulation, wire, cable and component insulation, membranes, vacuum applications, computers and communication devices.

The present invention more specifically discloses a curable polyisoprene rubber composition comprising: (1) a polyisoprene rubber comprised of repeat units that are derived from isoprene monomer, (2) a carbonyl inhibited platinum catalyst, and (3) a crosslinking agent having at least 2 hydrosilyl groups per molecule.

The subject invention also reveals a process for manufacturing an elastomeric article by compression molding, said process comprising the steps of: (I) compressing a curable polyisoprene rubber composition which is comprised of (1) a polyisoprene rubber comprised of repeat units that are derived from isoprene monomer, (2) a carbonyl inhibited platinum catalyst, and (3) a crosslinking agent having at least 2 hydrosilyl groups per molecule into a mold of the desired shape; (II) curing the curable polyisoprene composition in the mold at a temperature which is within the range of 100° C. to 250° C. to produce the elastomeric article; and (III) removing the elastomeric article from the mold.

DETAILED DESCRIPTION OF THE INVENTION

Virtually any polyisoprene rubber having a 3,4 microstructure content (vinyl content) of at least 0.5% can be cured by utilizing the technique of this invention. The polyisoprene rubber that can be cured in accordance with this invention will typically by a polyisoprene homopolymer. However, the polyisoprene rubber can, optionally, contain up to about 40 weight percent of other conjugated diolefin monomers, such as 1,3-butadiene, and/or vinyl aromatic monomers, such as styrene. Such copolymers will typically contain 70 weight percent to 99 weight percent isoprene monomer and 1 weight percent to 30 weight percent of the other copolymerizable monomers.

One representative example of a polyisoprene that can be cured in accordance with this invention can be synthesized in accordance with the technique disclose in U.S. patent application Ser. No. 10/368,660, filed on Feb. 18, 2003. This technique involves polymerizing isoprene monomer in the presence of a neodymium catalyst system, wherein the neodymium catalyst system is prepared by (1) reacting a neodymium carboxylate with an organoaluminum compound in the presence of isoprene for a period of about 10 minutes to about 30 minutes to produce neodymium-aluminum catalyst component, and (2) subsequently reacting the neodymium-aluminum catalyst component with a dialkyl aluminum chloride for a period of at least 30 minutes to produce the neodymium catalyst system to produce the polyisoprene rubber. The teachings of U.S. patent application Ser. No. 10/368,660 are incorporated herein by reference.

Curable compositions that are suitable for use in molding applications can be made by blending the polyisoprene rubber with the hydrosilylation catalyst and the crosslinking agent. The crosslinking agent will typically be used at a level which is within the range of 0.5 phr (parts by weight per 100 parts by weight of the polyisoprene rubber) to 10 phr. The crosslinking agent will preferably be present in the curable composition at a level which is within the range of 1 phr to 6 phr. The crosslinking agent will more preferably be present at a level of 2 phr to 4 phr. The hydrosilylation catalyst will typically be employed at a level which is within the range of 1 ppmr (parts of metal catalyst by weight per 1,000,000 parts by weight of the polyisoprene rubber) to 200 ppmr. The hydrosilylation catalyst will preferably be present in the curable composition at a level which is within the range of 20 ppmr to 100 ppmr. In curable compositions that are used in compression molding applications the crosslinking agent will normally be present at a level which is within the range of 2 phr to 4 phr and the hydrosilylation catalyst will normally be present at a level which is within the range of 25 ppmr to 75 ppmr. However, it should be noted that the exact level of crosslinking agent and catalyst required will depend upon the characteristics of the polyisoprene rubber and will normally be decreased with increasing levels of vinyl microstructure content in the polyisoprene rubber.

The crosslinking agents that can be used in the practice of this invention have at least 2 hydrosilyl groups per molecule. Crosslinking agents of this type are described in detail in U.S. Pat. No. 6,087,456. The teachings of U.S. Pat. No. 6,087,456 are incorporated herein by reference with respect to teaching the type of crosslinking agent (curing agent) that can be utilized in the practice of this invention. Some preferred branched crosslinking agents are of the structural formula:

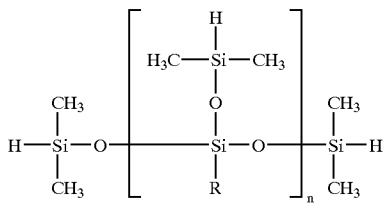

wherein n represents an integer from 1 to about 3, wherein R represents an alkyl group containing from 1 to 4 carbon atoms, a phenyl group, or a hydrosilyl group. The crosslinking agent will typically be a tetrakis(dialkyl siloxy) silane or a tris(dialkyl siloxy) alkyl silane. The crosslinking agent will more typically be a branched silane coupling agent such as tetrakis(dimethyl siloxy) silane, tris(dimethyl siloxy) methyl silane, and tris(dimethyl siloxy) phenyl silane.

A wide variety of hydrosilylation catalysts can be used in making the curable compositions of this invention. Some representative examples of suitable hydrosilylation catalysts include chloroplatinic acid, elemental platinum, solid platinum supported on a carrier (such as alumina, silica or carbon black), platinum-vinylsiloxane complexes {for instance: $Pt_n(ViMe_2SiOSiMe_2Vi)_n$ and $Pt[(MeViSiO)_4]_m$}, platinum-phosphine complexes {for example: $Pt(PPh_3)_4$ and $Pt(PBU_3)_4$}, and platinum-phosphite complexes {for instance: $Pt[P(OPh)_3]_4$ and $Pt[P(OBu)_3]_4$}, wherein Me represents methyl, Bu represents butyl, Vi represents vinyl and Ph represents phenyl, and n and m represent integers. The platinumhydrocarbon complex described in the specification of U.S. Pat. No. 3,159,601 and U.S. Pat. No. 3,159,662, and the platinum-alcoholate catalyst described in the specification of U.S. Pat. No. 3,220,972 can also be used. The teaching of U.S. Pat. No. 3,159,601, U.S. Pat. No. 3,159,662, and U.S. Pat. No. 3,220,972 are incorporated herein by reference.

Hydrosilylation catalysts containing metals other than platinum can also be used in the practice of this invention. Some representative examples of such catalysts include: $RhCl(PPh_3)_3$, $RhCl_3$, $Rh/Al_2O_3$, $RuCl_3$, $IrCl_3$, $FeCl_3$, $AlCl_3$, $PdCl_2.2H_2O$, $NiCl_2$, $TiCl_4$, and the like. These catalysts can be used alone or in combination. In view of catalytic activity, chloroplatinic acid, platinum-olefin complex, platinum-vinylsiloxane complex, and $Pt(acac)_2$, are preferable.

Inorganic fillers can also be added to the moldable compositions of this invention to enhance physical properties. Some representative examples of inorganic fillers that can be used include calcium carbonate, talc, silica, carbon black and other ordinary inorganic fillers. Silica fillers will typically be added at a level which is within the range of 5 phr to 40 phr and will preferably be added at a level of 15 phr to 30 phr. Since the curable composition of the present invention is formed by crosslinking by a hydrosilylation reaction, however, influences on the hydrosilylation reaction should be taken into consideration in using such a filler. For instance, if the filler has a high content of absorbed moisture, the moisture will react with the curing agent, which can result in foaming during the curing step. When the filler contains a component capable of interfering the hydrosilylation reaction, for example a nitrogen and/or sulfur atom, a reduction in curability or insufficient curing may result. Some fillers can have an influence on the storage stability of the curable composition. In using such an inorganic filler, it is important to confirm the influence of the inorganic filler on the curability and/or storage stability beforehand. If visual clarity is being sought it is also, of course, important to avoid fillers that will significantly reduce the clarity of the composition, such as carbon black.

One or more of antioxidants, ultraviolet absorbers, pigments, surfactants and other additives can also be incorporated in the curable polyisoprene rubber compositions of this invention in appropriate amounts. Again, the influence of these agents on the hydrosilylation reaction should also be taken into consideration.

EXAMPLE 1

This experiment demonstrates the unexpected dependence of hydrosilylation cure of polydiene rubber on branched silane coupling agents. Polyisoprene (400 grams) was milled according to ASTM D 3182 and a smooth sheet was obtained. The silane hydride was added next as a liquid and milled according to ASTM D 3182. After incorporation of the silane hydride, the noble metal catalyst was added dropwise and milled according to ASTM D 3182. When a silica filler is used, it can be added slowly at this point to the rubber while being milled. After all the components of the compounded rubber were mixed on the mill, the flat milled sheet was converted into cured tensile sheets by use of a 0.075 inch×6 inch×4 inch mold cavity. The tensile sheets were cured at a variety of mold temperatures and cure times. See Table 1 values measured on an Instron 5500R tensile testing machine were obtained for tear strength, tensile strength and elongation at break, also RPA Alpha 2000 values were obtained during sample curing at 356° F. As is evident from the data, branched silanes are unique under these conditions in their ability to undergo productive crosslinking in diene based rubbers. It should be noted that the linear di-silanes were ineffective for increasing the level of elongation.

TABLE 1

Hydrosilylation vulcanization

| Silane Type | Moles Si—H | Pt Level (ppm) | Elongation (%) | Tear (ppi) | Tensile (psi) |
|---|---|---|---|---|---|
| Branched tetrakis-silane | 0.043 | 45 | 1255 | 93 | 467 |
| Linear oligomeric-silane | 0.015 | 45 | not measured under cured | | |
| Linear di-silane | 0.13 | 45 | not measured under cured | | |
| Linear di-silane | 0.35 | 45 | 185 | 53 | 205 |

EXAMPLE 2

This experiment serves to demonstrate the unexpected increase in cured rubber elongation that is observed when hydrosilylation vulcanization as described in Example 1 is compared to traditional sulfur or peroxide compounding. For sulfur vulcanization, polyisoprene was initially mixed with 2 phr (parts by weight per 100 parts by weight of rubber) of zinc oxide and 2 phr of stearic acid to make a non-productive compound. A productive compound was subsequently prepared by mixing the non-productive compound with 2 phr of methyl tuads and 0.5 phr of sulfur. The compounds were then cured and the physical properties of the samples were evaluated. Likewise, for peroxide based vulcanization, the rubber was mixed with 0.4 phr of DI-CUP R peroxide and 2 phr of Sartomer SR350 peroxide co-curing agent. The compounds were then cured and the physical properties of the samples were evaluated. The tensile strength, elongation at break and tear strength of the cured rubber samples is reported in Table 2.

As is evident from the comparison of cure methods in Table 2, hydrosilylation as described in Example 3 leads to an unexpected and significant increase in the cured rubber elongation.

TABLE 2

Improved elongation

| Cure Method | Elongation (%) | Tear (ppi) | Tensile (psi) |
|---|---|---|---|
| hydrosilylation | 1255 | 93 | 467 |
| peroxide | 695 | 85 | 647 |
| sulfur | 715 | 142 | 2267 |

EXAMPLE 3

This experiment serves to demonstrate the effectiveness of hydrosilylation as practiced in this invention at various cure times and temperatures. In the procedure used polyisoprene (400 grams) was milled smooth as in Example 1. The preferred tetrakis-silane hydride (3 phr) was added next followed by 23 ppm of Pt catalyst. After all the components of the compounded rubber were mixed on the mill, the flat milled sheet was converted into cured tensile sheets by use of a 0.075 inch×6 inch×4 inch mold cavity. The tensile sheets were cured at a variety of mold temperatures and cure times. See Table 3 where the values determined utilizing the Instron 5500R tensile testing machine were obtained for tear strength, tensile strength and elongation at break.

TABLE 3

Hydrosilylation with 23 ppm Pt and 3 phr branched silane

| Cure Temp (C) | Cure Time (min) | Elongation (%) | Tear (ppi) | Tensile (psi) |
|---|---|---|---|---|
| 180 | 30 | 941 | 89 | 404 |
| 190 | 15 | 927 | 97 | 442 |
| 200 | 10 | 1249 | 83 | 418 |

EXAMPLE 4

This experiment serves to further demonstrate the effectiveness of hydrosilylation as practiced in this invention at various cure times. In the procedure used polyisoprene (400 grams) was milled smooth as in Example 1. The preferred tetrakis-silane hydride (2 phr) was added next followed by 45 ppm of Pt catalyst. After all the components of the compounded rubber were mixed on the mill, the flat milled sheet was converted into cured tensile sheets by use of a 0.075 inch×6 inch×4 inch mold cavity. The tensile sheets were cured at a variety of mold temperatures and cure times. See Table 4 where tear strength, tensile strength and elongation at break as measured with the Instron 5500R tensile testing machine are shown.

TABLE 4

Hydrosilylation with 45 ppm Pt and 2 phr branched silane

| Cure Temp (C) | Cure Time (min) | Elongation (%) | Tear (ppi) | Tensile (psi) |
|---|---|---|---|---|
| 196 | 5 | 922 | 81 | 368 |
| 196 | 7.5 | 928 | 86 | 395 |
| 196 | 10 | 906 | 95 | 434 |

EXAMPLE 5

This experiment serves to demonstrate the effectiveness of hydrosilylation as practiced in this invention in the presence of a silica filler and the increased tensile strength that results. Polyisoprene (400 g) was milled smooth as in Example 1. The preferred tetrakis-silane hydride (2.5 phr) was added next followed by 45 ppm of Pt catalyst. Finally, 5 phr of a silica filler was slowly added to the rubber while being milled. After all the components of the compounded rubber were mixed on the mill, the flat milled sheet was converted into cured tensile sheets by use of a 0.075 inch×6 inch×4 inch mold cavity. The tensile sheets were cured at 196° C.

See Table 5 where tear strength, tensile strength and elongation at break as measured with the Instron 5500R tensile testing machine are provided.

TABLE 5

Hydrosilylation with 45 ppm Pt, 2.5 phr silane, and 5 phr silica filler

| Cure Temp (C) | Cure Time (min) | Elongation (%) | Tear (ppi) | Tensile (psi) |
|---|---|---|---|---|
| 196 | 12.5 | 810 | 114 | 1728 |

EXAMPLE 6

This experiment is a comparative study demonstrating that peroxide based formulations can be optimized for tensile and tear with silica fillers but elongation remains below 550%. In the procedure used each of the rubber samples were initially mixed with 0.02 phr of Ultramarine blue and 0 to 40 phr of amorphous silica to make a non-productive compound. A productive compound was subsequently prepared by mixing the non-productive compound with 1.66 phr of EF(DBDB)-60 peroxide and 2 phr of Sartomer SR350 peroxide co-curing agent. The compounds were then cured and the physical properties of the samples were evaluated. The tensile strength, elongation at break and tear strength of the cured rubber samples is reported in Table 6.

TABLE 6

Peroxide vulcanization

| Silica Filler (phr) | Elongation (%) | Tear (ppi) | Tensile (psi) |
|---|---|---|---|
| 0 | 191 | 86 | 163 |
| 10 | 429 | 128 | 1182 |
| 20 | 476 | 123 | 2077 |
| 40 | 524 | 187 | 2864 |

EXAMPLE 7

This experiment is a comparative study demonstrating that sulfur based gum formulations can be optimized for tensile strength by increasing sulfur content at decreased elongation. For this example, 114 phr of polyisoprene was initially mixed with 3 phr of zinc oxide and 2 phr of stearic acid to make a non-productive compound. A productive compound was subsequently prepared by mixing the non-productive compound with 0.5 phr MBTS, 0.25 phr MBT, 0.4 phr DOTG/C and 1.0 to 3.0 phr of sulfur. The compounds were then cured and the physical properties of the samples were evaluated. The tensile strength and elongation at break of the cured rubber samples is reported in Table 7.

TABLE 7

Sulfur vulcanization

| Sulfur (phr) | Elongation (%) | Tensile (psi) |
|---|---|---|
| 1 | 737 | 1304 |
| 2 | 705 | 1967 |
| 3 | 698 | 2525 |

EXAMPLE 8

This example serves to demonstrate the unexpected finding that polyisoprene rubber which is clear can be cured into a baby bottle nipple utilizing the curative system of this invention without compromising the clarity of the rubber. Clarity, as a measure of percent transmittance, was determined using a HACH DR/4000U spectrophotometer. Typical polyisoprene nipples cured traditionally with sulfur or peroxide were compared to experimental nipples prepared using the hydrosilylation vulcanization technique as described in Examples 1 and 3. As is evident from the comparison in Table 8 nipples prepared following the teachings of this invention provide cured materials without compromising the clarity of the raw rubber.

TABLE 8

Clear baby bottle nipple using hydrosilylation vulcanization cure.

| Nipple Type | % Transmittance |
|---|---|
| Sulfur | 3.8 |
| Peroxide | 45.8 |
| Pt/Hydrosilylation | 78.2 |
| Uncured Polyisoprene | 85.1 |

While certain representative embodiments and details have been shown for the purpose of illustrating the subject invention, it will be apparent to those skilled in this art that various changes and modifications can be made therein without departing from the scope of the subject invention.

What is claimed is:

1. A curable polyisoprene rubber composition comprising: (1) a polyisoprene homopolymer rubber comprised of repeat units that are derived from isoprene monomer, (2) a carbonyl inhibited platinum catalyst, and (3) a branched crosslinking agent of the structural formula:

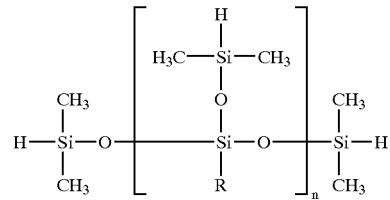

wherein n represents an integer from 1 to about 3, wherein R represents an alkyl group containing from 1 to 4 carbon atoms, a phenyl group, or a hydrosilyl group.

2. A curable composition as specified in claim 1 wherein said polyisoprene rubber has a vinyl microstructure content of at least 0.5 percent.

3. A curable composition as specified in claim 1 wherein the polyisoprene rubber has a vinyl microstructure content within the range of 1 percent to 4 percent.

4. A curable composition as specified in claim 1 wherein the polyisoprene rubber has a vinyl microstructure content within the range of 3 percent to 8 percent.

5. A curable composition as specified in claim 2 wherein the crosslinking agent having at least 2 hydrosilyl groups per molecule is a tetrakis(dialkylsiloxy)silane.

6. A curable composition as specified in claim 2 wherein the crosslinking agent having at least 2 hydrosilyl groups per molecule is tetrakis(dimethylsiloxy)silane.

7. A curable composition as specified in claim 2 wherein the crosslinking agent having at least 2 hydrosilyl groups per molecule is tris(dialkylsitoxy)methyl silane.

8. A curable composition as specified in claim 2 wherein the crosslinking agent having at least 2 hydrosilyl groups per molecule is tris(dimethylsiloxy)methyl silane.

9. A curable composition as specified in claim 2 wherein the hydrosilylation catalyst is present at a level which is within the range of 1 ppmr to 200 ppmr.

10. A curable composition as specified in claim 9 wherein the crosslinking agent is present at a level which is within the range of 0.5 phr to 10 phr.

11. A curable composition as specified in claim 10 wherein the hydrosilylation catalyst is present at a level which is within the range of 20 ppmr to 100 ppmr.

12. A curable composition as specified in claim 11 wherein the crosslinking agent is present at a level which is within the range of 1 phr to 6 phr.

13. A curable composition as specified in claim 12 wherein the crosslinking agent is present at a level which is within the range of 2 phr to 4 phr.

14. A curable composition as specified in claim 13 wherein the hydrosilylation catalyst is present at a level which is within the range of 25 ppmr to 75 ppmr.

* * * * *